June 9, 1925.
O. W. DUNHAM
1,541,124
STUFFING BOX FOR BEARINGS
Filed June 17, 1920 2 Sheets-Sheet 1
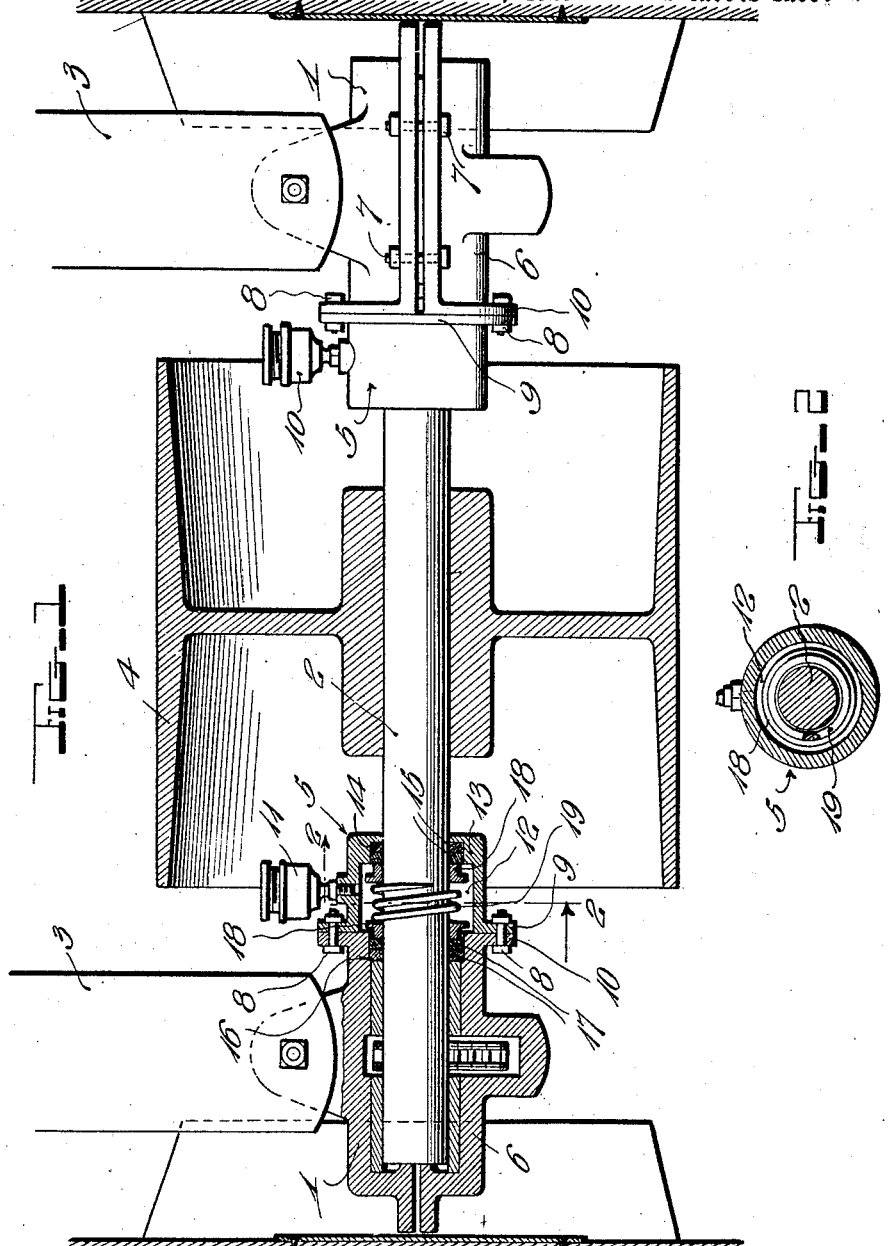
Inventor
O.W. Dunham

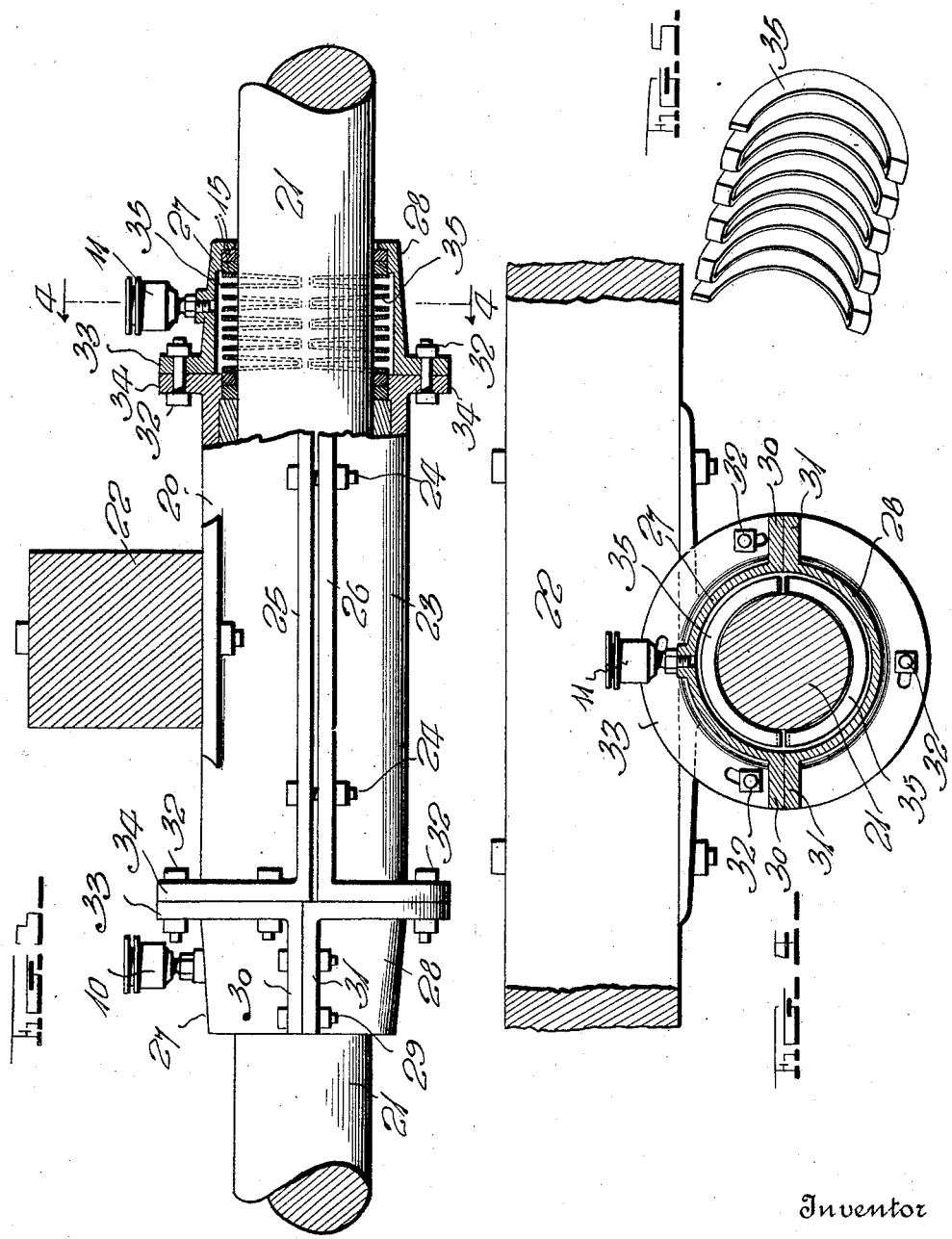

Patented June 9, 1925.

1,541,124

UNITED STATES PATENT OFFICE.

ORSON WINFIELD DUNHAM, OF TREECE, KANSAS.

STUFFING BOX FOR BEARINGS.

Application filed June 17, 1920. Serial No. 389,742.

*To all whom it may concern:*

Be it known that I, ORSON W. DUNHAM, a citizen of the United States, residing at Treece, in the county of Cherokee and State of Kansas, have invented certain new and useful Improvements in Stuffing Boxes for Bearings; and I do declare the following to be a full, clear, and exact description of the invention, such as will enable others skilled in the art to which it appertains to make and use the same.

This invention relates to an improved stuffing box for use in connection with a bearing and one object of the invention is to provide a stuffing box so constructed that a bearing may be protected from water and also from dust and dirt.

Another object of the invention is to provide a stuffing box so constructed that it may be easily associated with a bearing, the stuffing being connected with one end of the bearing about the shaft journaled in the bearing.

Another object of the invention is to so construct this stuffing box that heavy grease may be forced into the same and to further so construct it that packing may be tightly compressed in the stuffing box by a spring element positioned intermediate the length of the box.

This invention is illustrated in the accompanying drawings, wherein:—

Figure 1 is a view showing a pulley carrying shaft journaled in bearings provided with the improved stuffing boxes, the bearing and stuffing box at one end of the shaft being shown in section, Figure 2 is a sectional view taken along the line 2—2 of Figure 1, Figure 3 is a view showing a modified construction of bearing and stuffing box, the view being partially in elevation and partially in longitudinal section, Figure 4 is a sectional view taken along the line 4—4 of Figure 3, and Figure 5 is a perspective view of one of the springs shown in Figures 3 and 4.

In the form shown in Figures 1 and 2, the stuffing box has been shown in connection with the bearing 1 which connects the shaft 2 with the lower end of the jack arm 3 forming part of a conveyor structure such as is used in connection with a windmill where an endless conveyor passes about a pulley wheel 4. The jack timbers 3 extend down into the pit below the water level thereof and therefore, the shaft 2 and the bearings 1 which rotatably mount this shaft will be embedded in the water and under ordinary conditions, the water will work into the bearings thus causing the bearings and the shaft 2 to be very quickly worn out. By providing the improved stuffing boxes for the bearings, the water will be excluded from entering the bearings and, therefore, the shaft and the bearings will not be quickly worn out. These stuffing boxes which are used are of a duplicate construction, and therefore, a description of one will suffice for both.

Each of these stuffing boxes 5 is placed upon the shaft before the lower section 6 of the bearing is put in place and secured by the bolts 7 and the stuffing box is then moved to engage the end of the bearing and the stuffing box is connected to the bearing by the bolts 8 which extend through elongated openings 8' formed in the flanges 9 and corresponding openings 10 of the stuffing box and bearing. It will thus be seen that the stuffing box will be releasably and adjustably held in place and can be removed when desired. It will be further noted that the stuffing box carries a grease cup 11 by means of which heavy grease can be forced into the stuffing box. This stuffing box is provided with the grease receiving chamber 12 and at its outer end is provided with a head 13 through which the shaft 2 passes, the head being counterbored to provide a pocket 14 in which packing 15 will be placed. The outer end portion of the bearing 1 will also be counterbored to provide a pocket 16 to receive the packing 17 and compressing collars 18 are slidably mounted upon the shaft 2 within the chamber 12 and engaged by a spring 19 which serves to move the collars 18 into engagement with the packing 15 and 17 to tightly compress the packing about the shaft and thus form a tight joint so that water cannot enter the stuffing box and pass through the stuffing box into the bearing. It will thus be seen that the packing and the grease with which the packing is soaked will provide a very tight joint and prevent damage to the shaft and bearing.

In the form shown in Figs. 3, 4 and 5, the stuffing box is of a slightly different construction and is used in connection with a bearing 20 which rotatably supports a shaft 21 from a supporting beam or bar 22.

This bearing 20 has its lower section 23 releasably held in place by bolts 24 which pass through the flanges 25 and 26 of the upper and lower sections of the bearing. In this form, the stuffing box will be provided with upper and lower sections 27 and 28 which will be releasably connected by bolts 29 which pass through the side flanges 30 and 31 of the sections. Bolts 32 are passed through elongated openings 32' formed in the flanges 33 and 34 of the upper and lower sections of the bearing and stuffing box and the stuffing box will thus be securely but adjustably and releasably held about the shaft and in engagement with the bearing. The interior construction of the stuffing box is similar to that shown in Fig. 1 except that the rings 18 are omitted and the spring instead of being an ordinary coil spring as used in Fig. 1 is formed in two sections 35. Each of these sections 35 is formed from a strand of resilient material which is bent as shown and will be substantially semi-circular. With this construction, the stuffing box can be put in place with the shaft already passing through the bearing 20 thereby making it possible to easily connect the stuffing box with a bearing already in use and further making it easy to remove the stuffing box for cleaning or for renewing the packing and springs if necessary.

What is claimed is:—

1. The combination with a bearing having a shaft therein an annular packing receiving pocket and an annular flange on its end, said flange having bolt holes; of a cup-shaped stuffing box, having its outer closed end counter-bored to provide a shaft passage and a packing pocket, an annular flange on the inner end of said box to fit against the flanged end of said bearing, said stuffing box flange having elongated bolt holes to coincide with the bolt holes in said bearing flange, fastening bolts engaged with the bolt holes in said flanges whereby said box is secured in place after proper adjustment on the shaft, packing in said pockets and resilient means positioned about the shaft between the packings and adapted to expand to compress the packings in said pockets.

2. The combination with a bearing having a shaft therein an annular packing receiving pocket and a packing therein; of a cup-shaped stuffing box formed in longitudinal sections fastened together and having an adjustable connection with the end of the bearing, said box having its closed outer end counter-bored to form a shaft passage and an annular packing pocket, packing arranged in said pocket, coiled springs formed in semi-cylindrical sections positioned around the shaft in the stuffing box and between said packings and adapted to expand to compress said packings in said pockets.

In testimony whereof I have hereunto set my hand in the presence of two subscribing witnesses.

ORSON WINFIELD DUNHAM.

Witnesses:
D. LEE HANERY,
L. R. MCCORMICK.